US008983368B2

United States Patent
Kung (10) Patent No.: US 8,983,368 B2
(45) Date of Patent: Mar. 17, 2015

(54) WIRELESS BRIDGE DEVICE AND WIRELESS COMMUNICATION SYSTEM THEREOF

(71) Applicant: Dexin Corporation, New Taipei (TW)

(72) Inventor: Tai-Yuan Kung, New Taipei (TW)

(73) Assignee: Dexin Corporation, New Taipei (TW)

( * ) Notice: Subject to any disclaimer, the term of this patent is extended or adjusted under 35 U.S.C. 154(b) by 179 days.

(21) Appl. No.: 13/851,077

(22) Filed: Mar. 26, 2013

(65) Prior Publication Data

US 2014/0295753 A1 Oct. 2, 2014

(51) Int. Cl.
*H04B 7/15* (2006.01)
*H04B 7/00* (2006.01)
*H04W 76/02* (2009.01)

(52) U.S. Cl.
CPC ..................... *H04W 76/02* (2013.01)
USPC ......................... 455/11.1; 455/41.2

(58) Field of Classification Search
USPC ............. 455/11.1, 41.1, 41.2, 41.3; 379/55.1, 379/90.01, 338
See application file for complete search history.

(56) References Cited

U.S. PATENT DOCUMENTS

| | | | |
|---|---|---|---|
| 8,693,466 B2 * | 4/2014 | Johnson | 370/356 |
| 2005/0152337 A1 * | 7/2005 | Wurtzel et al. | 370/352 |
| 2005/0282541 A1 * | 12/2005 | Iizuka et al. | 455/426.2 |
| 2007/0263804 A1 * | 11/2007 | Lai et al. | 379/93.05 |
| 2008/0280561 A1 * | 11/2008 | Lin | 455/41.2 |
| 2009/0163179 A1 * | 6/2009 | Brannan et al. | 455/412.2 |
| 2010/0105445 A1 * | 4/2010 | Brunton et al. | 455/567 |

* cited by examiner

*Primary Examiner* — Nguyen Vo (74) *Attorney, Agent, or Firm* — Li & Cai Intellectual Property (USA) Office (57) ABSTRACT

A wireless bridge device for communicating between a telephone of a public switched telephone network and a wireless transceiver includes a first connecting port, a second connecting port, a first wireless communication module and a first audio conversion module. The first connecting port is coupled to a console base of the telephone. The second connecting port is coupled to a telephonic handset of the telephone. The first wireless communication module outputs wirelessly an incoming signal and receives wirelessly an outgoing signal. The first audio conversion module is coupled between the first connecting port and the first wireless communication module. The first audio conversion module determines whether the incoming signal is received or not. If so, the first audio conversion will convert sound signals transmitted between the telephone and the wireless transceiver.

10 Claims, 4 Drawing Sheets

WIRELESS BRIDGE DEVICE AND WIRELESS COMMUNICATION SYSTEM THEREOF

BACKGROUND OF THE INVENTION

1. Field of the Invention

The present invention relates to a wireless bridge device and wireless communication system thereof; in particular, to a wireless bridge device coupled to telephones of a public switched telephone network, and a wireless communication system thereof.

2. Description of Related Art

Public Switched Telephone Networks (PSTN) has been developed for a hundred and thirty years, and is generally provided in each household, businesses, schools, institutions or groups. Thus, people often communicate mutually through the public switched telephone network, for example, people call someone to perform communication on the city telephone. The popularity of the public switched telephone network will reduce communication costs.

However, the city telephone is limited by the position of the layout of the public switched telephone network, so the city telephone is set at a fixed position in each household, businesses, schools, institutions or groups. Furthermore, the city telephone is limited by the length of handset cords between telephonic handset and console base, so that the range of human activities for using the city telephone is also limited, thus resulting in inconvenience of using the city telephone.

SUMMARY OF THE INVENTION

The present invention is for providing a wireless bridge device and a wireless communication system thereof, in order to solve the aforementioned problems.

The present invention discloses a wireless bridge device, for communicating between a telephone of public switched telephone network and a wireless transceiver, and the wireless bridge device comprises a first connecting port, a second connecting port, a first wireless communication module and a first audio conversion module. The first connecting port is coupled to a console base of the telephone. The second connecting port is coupled to a telephonic handset of the telephone. The first wireless communication module is for wirelessly transmitting an incoming signal transmitted from the console base to the wireless transceiver, and for wirelessly receiving an outgoing signal that is transmitted from the wireless transceiver to the first connecting port. The first audio conversion module is coupled between the first wireless communication module and the first connecting port, wherein the first audio conversion module determines whether the incoming signal is received correctly; if so, the first audio conversion module establishes a connection between the first wireless communication module and the wireless transceiver, for converting sound signals transmitted between the telephone and the wireless transceiver.

In an embodiment of the present invention, when the first audio conversion module receives the incoming signal through the first connecting port, the first audio conversion module converts the sound format of the incoming signal and the converted sound format is outputted to the wireless transceiver through the first wireless communication module.

In an embodiment of the present invention, after the first audio conversion module receives the incoming signal, the first wireless communication module wirelessly receives the outgoing signal transmitted from the wireless transceiver, and the sound format of the outgoing signal is converted and outputted to the first connecting port.

In an embodiment of the present invention, the first audio conversion module determines that the connection between the first connecting port and the second connecting port is turned on when the incoming signal has not been received.

In an embodiment of the present invention, the wireless bridge device includes a first power supply module, wherein the first power supply module is for providing power to the first wireless communication module and the first audio conversion module.

In an embodiment of the present invention, the first power supply module is at least one battery, at least one charged battery or a power connection port externally coupled to a commercial power.

In an embodiment of the present invention, the wireless bridge device further comprises two handset cords, one of the handset cords is coupled to the first connecting port and the console base, the other one of the handset cords is coupled to the second connecting port and the telephonic handset.

In an embodiment of the present invention, when the telephone is connected with the public switched telephone network to wait for receiving the incoming signal, the connection between the first connecting port and the second connecting port is turned on to transmit signals.

In an embodiment of the present invention, when the telephone is connected with the public switched telephone network to wait for receiving the incoming signal, the first audio conversion module conducts the transmission signals between the first connecting port and the second connecting port.

The present invention discloses a wireless communication system comprising a wireless transceiver and a wireless bridge device. The wireless transceiver is for receiving an outgoing signal. The wireless bridge device is for wirelessly transmitting the incoming signal, transmitted from the console base to the telephonic handset, to the wireless transceiver, and for transmitting the outgoing signal received from the wireless transceiver to the console base, wherein when the wireless transceiver wirelessly receives the incoming signal, the incoming signal is converted to sound and played.

In an embodiment of the present invention, the wireless transceiver comprises a microphone module, a speaker module, a second wireless communication module and a second audio conversion module. The microphone module is for receiving the outgoing signal. The speaker module is for playing the incoming signal. The second wireless communication module is for wirelessly transmitting the outgoing signal and wirelessly receiving the incoming signal. The second audio conversion module is coupled among the microphone module, the speaker module and the second wireless communication module, for performing a sound conversion of the signals transmitted among the microphone module, the speaker module and the second wireless module.

In an embodiment of the present invention, the wireless transceiver comprises a second power supply module, and the second power supply module supplies power to the second wireless communication module, the second audio conversion module, the microphone module and the speaker module.

In an embodiment of the present invention, wireless signals are transmitted between the first wireless communication module and the second wireless communication module based on a Bluetooth protocol, a Wireless LAN protocol, a Wireless PAN protocol, a Wi-Fi protocol, an IEEE 802.11 protocol or a ZigBee (802.15.4) protocol.

In the specific means of the present invention, the wireless bridge device is coupled between the console base and the telephonic handset of a general telephone, and the wireless bridge device and the wireless transceiver may transmit wireless signals, so that the outgoing signal or the incoming signal is processed by the wireless bridge device and transmitted to the public switched telephone network or the wireless transceiver. As a result, the communication path, which may comprise the internet, the wireless cellular base stations and the switching machine, may be saved in the present invention, so that the process for converting a signal will be simplified and the communication quality is enhanced.

For further understanding of the present disclosure, reference is made to the following detailed description illustrating the embodiments and examples of the present disclosure. The description is only for illustrating the present disclosure, not for limiting the scope of the claim.

BRIEF DESCRIPTION OF THE DRAWINGS

The drawings included herein provide further understanding of the present disclosure. A brief introduction of the drawings is as follows.

DETAILED DESCRIPTION OF THE PREFERRED EMBODIMENTS

First Embodiment

Figure 1:
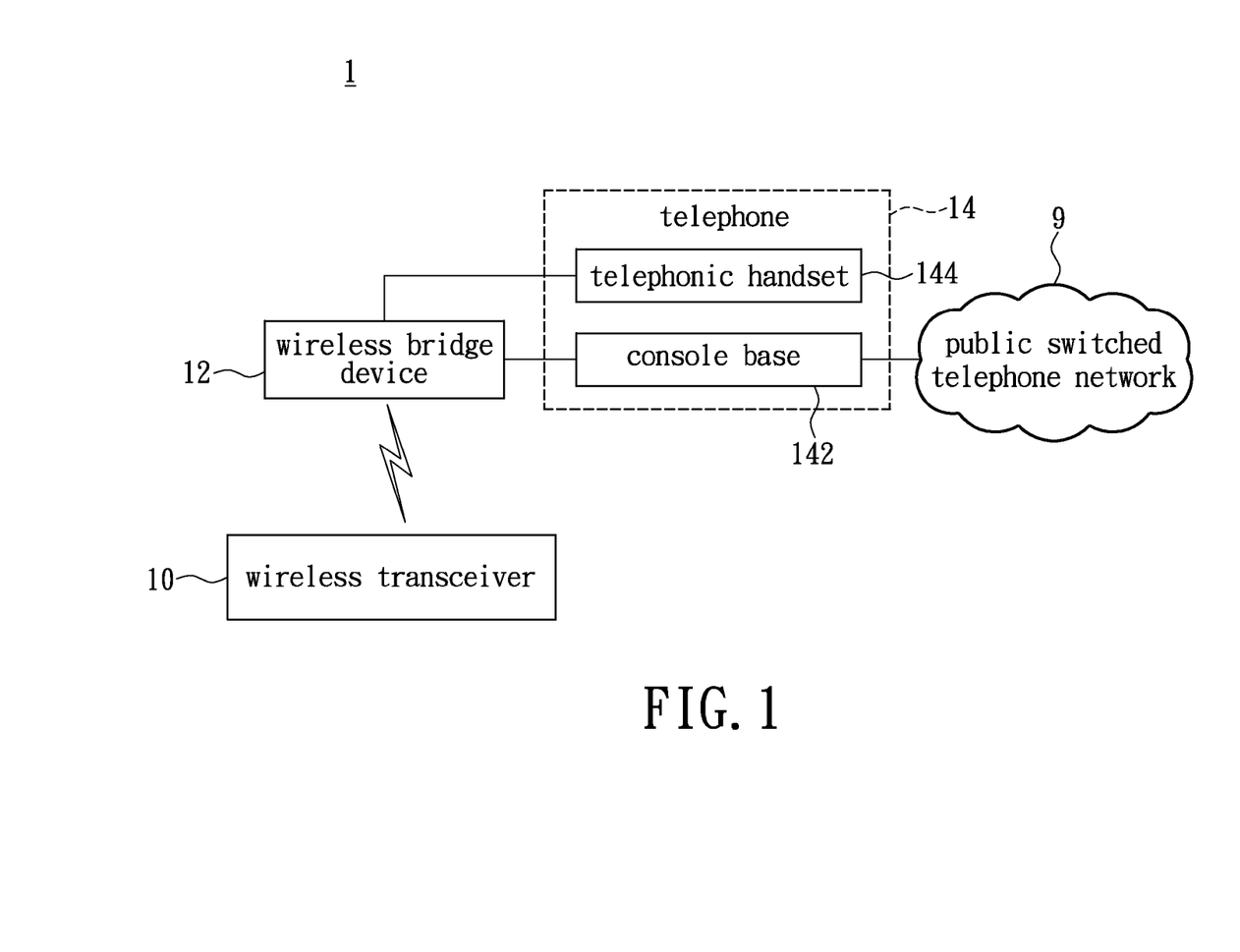
FIG. 1 shows a diagram of a wireless communication system of the present invention.

In a first exemplary embodiment of the invention, FIG. 1 shows a diagram of a wireless communication system. Please refer to FIG. 1. A wireless communication system 1 may comprise a wireless transceiver 10 and a wireless bridge device 12. Practically, the wireless communication system 1 of the present invention may be provided in each household, business, schools, institutions or groups etc. Therefore, the user may perform wireless communication, trigonal meeting, or multi-party talking through the wireless communication system 1. The operation of the wireless communication system 1 is not limited in this embodiment of the present disclosure.

The wireless transceiver 10 may receive an outgoing signal. The wireless transceiver 10 for instance may be a mobile phone, a smart phone, a notebook computer, a tablet PC, or a personal digital assistant (PDA) and so on. The type of the wireless transceiver 10 of the present invention is not limited. For example, the user may speak through the wireless transceiver 10. Thus, the wireless transceiver 10 will receive an outgoing signal, and wirelessly transmit the said outgoing signal to the wireless bridge device 12.

The wireless bridge device 12 is coupled to a telephone 14 of a public switched telephone network 9. To explain in detail, the wireless bridge device 12 is coupled between a console base 142 and a telephonic handset 144 of the telephone 14, and wirelessly transmits an incoming signal transmitted between the console base 142 and the telephonic handset 144 to the wireless transceiver 10, and wirelessly receives an outgoing signal which is transmitted from the wireless transceiver 10 to the console base 142.

Practically, the wireless transceiver 10 may transmit an outgoing signal to the telephone 14 of a public switched telephone network 9 through the wireless bridge device 12. On the contrary, the telephone 14 of the public switched telephone network 9 may transmit the incoming signal to the wireless transceiver 10 through the wireless bridge device 12. Therefore, the outgoing signal or the incoming signal will be transmitted via the wireless bridge device 12 to the telephone 14 of the public switched telephone network 9 or to the wireless transceiver 10.

In addition, except that the wireless transceiver 10 receives and transmits the outgoing signal, the wireless transceiver 10 also wirelessly receives the incoming signal, and then the incoming signal will be converted to sound and played.

For example, the user may use a mobile phone to call the city telephone. When the mobile phone receives the outgoing signal generated by the user, the mobile phone will transmit the outgoing signal to a switching machine through a wireless cellular base station, and then the switching machine will transmit the outgoing signal to the city telephone through the public switched telephone network 9. Thus, the outgoing signal will be processed by the switching machine and the wireless cellular base station. The said process will increase the communication costs and reduce the communication quality between the mobile phone and the city telephone.

Therefore, the wireless communication system 1 of the present invention will make the wireless transceiver 10 receive the outgoing signal through the wireless bridge device 12, and the said outgoing signal does not go through the path comprising the switching machine and the wireless cellular communication network. The said outgoing signal may be transmitted directly to the public switched telephone network 9 through the wireless bridge device 12. In the same manner, the public switched telephone network 9 transmits the incoming signal to the telephone 14, and the telephone 14 transmits the incoming signal to the wireless transceiver 10 through the wireless bridge device 12. Thus, in the present invention the transmission path between the mobile phone and the public switched telephone network 9 is saved, and communication quality of the mobile phone and the city telephone is enhanced, thus the present invention may also save the communication costs.

From the description above, in the present invention the wireless bridge device 12 is coupled between the console base 142 and the telephonic handset 144 of the telephone 14, and the wireless signal may be transmitted between the wireless bridge device 12 and the wireless transceiver 10. Thus, the outgoing signal transmitted from the wireless transceiver 10 or the incoming signal transmitted from the console base 142 will be processed by the wireless bridge device 12, and then transmitted to the public switched telephone network 9 or the wireless transceiver 10. As a result, in the present invention the communication path, which may comprise the internet, the wireless cellular base stations and the switching machine, may be saved, so that the process for converting signal will be simplified and the communication quality is enhanced.

Second Embodiment

Figure 2:
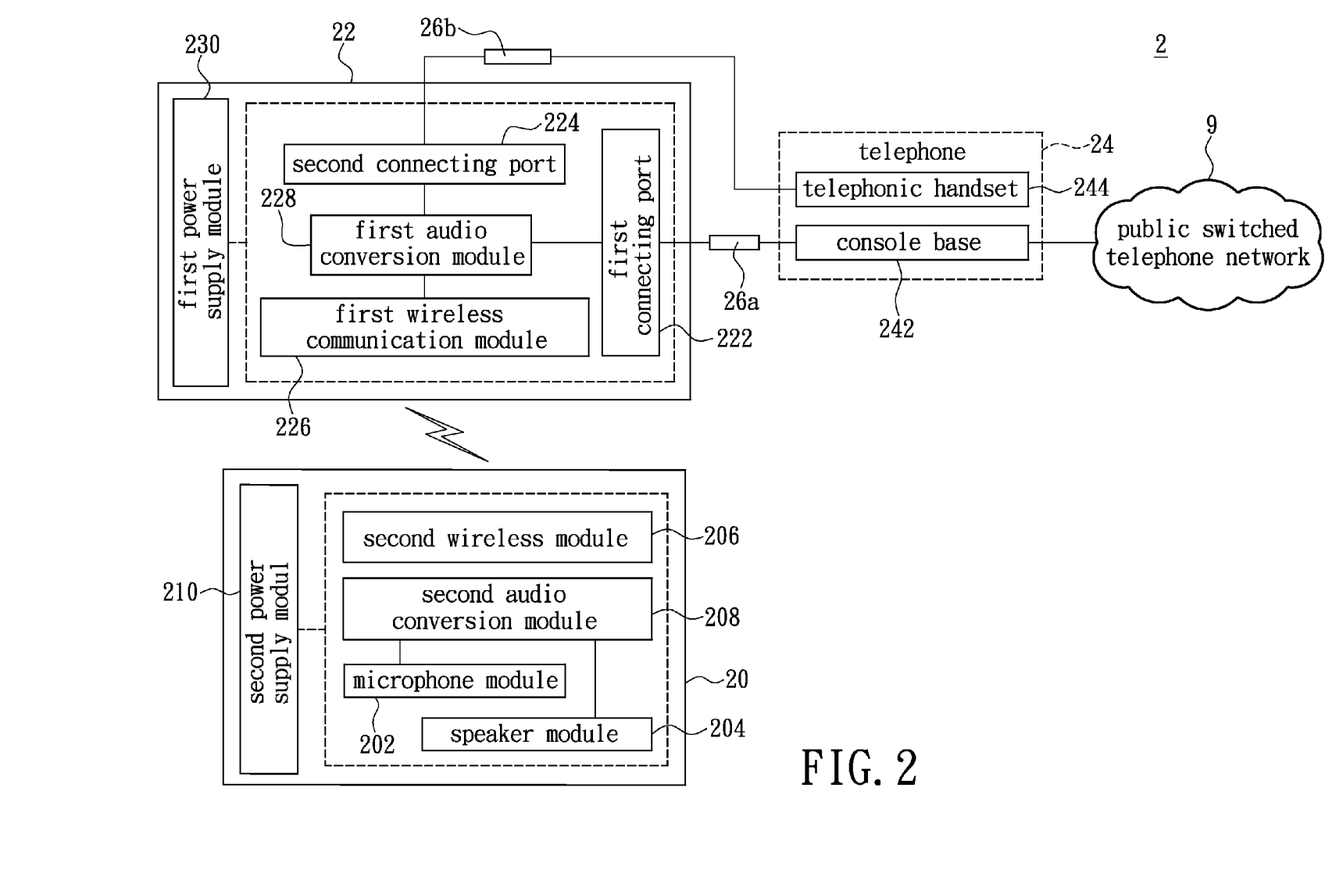
FIG. 2 shows a diagram of a wireless communication system of another embodiment in the present invention according to FIG. 1.

In a second exemplary embodiment of the invention, FIG. 2 shows a diagram of a wireless communication system of another embodiment in the present invention according to FIG. 1. Please refer to FIG. 2. The wireless bridge device 22 may comprise a first connecting port 222, a second connecting port 224, a first wireless communication module 226 and a first audio conversion module 228. Practically, the first connecting port 222 is coupled to the console base 242, and the second connecting port 224 is coupled to telephonic handset 244. The first and the second connecting port 222, 224 both are connecting ports of a general telephone, such as RJ-11 etc. The types of the first and the second connecting port 222, 224 of the present invention are not limited.

The first wireless communication module 226 is coupled to the first audio conversion module 228. The first wireless communication module 226 for instance may be the following one but not limited thereto: a Bluetooth communication transceiver, a Wireless LAN communication transceiver, a Wireless PAN Communication transceiver, a Wi-Fi communication transceiver, an IEEE 802.11 communication transceiver or a ZigBee (802.15.4) communication transceiver. The type of the first wireless communication module 226 of the present invention is not limited. Of course, the first wireless communication module 226 may transmit wirelessly the incoming signal and receive wirelessly the outgoing signal.

The first audio conversion module 228 is coupled between the first wireless communication module 226 and the first connecting port 222, for converting sound signals transmitted between the first connecting port 222 and the first wireless communication module 226. Practically, the first audio conversion module 228 is for converting analog audio to digital audio signals, or converting digital audio to analog audio signals. Thus, the first audio conversion module 228 may convert sound signals.

To explain in detail, the first audio conversion module 228 determines whether an incoming signal is received or not. If so, the first audio conversion module 228 will build the connection between the first wireless communication module 226 and the wireless transceiver 20, and convert sound signals transmitted wirelessly between the telephone 24 and the wireless transceiver 20.

It is worth noting that the first audio conversion module 228 may receive the incoming signal through the first connecting port 222, the first audio conversion module 228 will perform sound format conversion of the incoming signal, and transmit the converted sound format to the wireless transceiver 20 through the first wireless communication module 226. After the first audio conversion module 228 receives the incoming signal, the first wireless communication module 226 will wirelessly receive the outgoing signal transmitted from the wireless transceiver 20, and the converted sound format of the outgoing signal is outputted to the first connecting port 222. In addition, the first audio conversion module 228 determines that the incoming signal has not been received, then the first audio conversion module 228 will control the conduction between the first connecting port 222 and the second connecting port 224.

Next, the first audio conversion module 228 may convert sound signals transmitted between the first connecting port 222 and the first wireless communication module 226. After the first audio conversion module 228 receives the incoming signal, the first wireless communication module 226 will wirelessly transmit the incoming signal transmitted from the console base 242, and wirelessly receive the outgoing signal transmitted from the wireless transceiver 20. The first audio conversion module 228 determines whether the incoming signal is received or not. If not, the connection between the first connecting port 222 and the second connecting port 224 will be turned on, so as to transmit a dialing signal or a ringing signal.

In practice, the first audio conversion module 228 of the present invention may conduct signals transmission between the first connecting port 222 and the second connecting port 224, so that signals may be transmitted between the first connecting port 222 and the second connecting port 224. Certainly, the first audio conversion module 228 of the present invention may stop signals transmission between the first connecting port 222 and the second connecting port 224, so that signals may not be transmitted between the first connecting port 222 and the second connecting port 224. Thus, the first audio conversion module 228 may convert sound signals transmitted between the first connecting port 222 and the first wireless communication module 226.

To explain in detail, the initial setting of the first audio conversion module 228 is to turn on signals transmission between the first connecting port 222 and the second connecting port 224. Thus, the user may dial the phone number through the console base 242, and listen through the telephonic handset 244 the dialing tone and the ringing of the counterpart telephone. At this moment, the counterpart telephone has not been picked up, so a communication connection has not been established at two sides. Therefore, the first audio conversion module 228 determines that the incoming signal has not been received yet, wherein the first audio conversion module 228 still turns on signals transmission between the first connecting port 222 and the second connecting port 224.

When the counterpart telephone is picked up, the two sides establishes a communication connection. Therefore, the first audio conversion module 228 determines that the incoming signal is received, wherein the telephone 24 is coupled with the public switched telephone network 9 and receives the incoming signal, while the first audio conversion module 228 stops the signals transmission between the first connecting port 222 and the second connecting port 224, and turns on the signals transmission between the first connecting port 222 and the first wireless communication module 226. As a result, the user will wirelessly communicate with the wireless bridge device 22 through the wireless transceiver 20.

For example, the first user may use telephone 24 coupled to the public switched telephone network 9 to call the second user, and the second user in the other side of the public switched telephone network 9 has not picked up the telephone, wherein the first audio conversion module 228 may still turn on the signals transmission between the first connecting port 222 and the second connecting port 224. Therefore, the first user may listen through the telephonic handset 244 the ringing of the telephone from the second user. When the second user picks up telephone, the first audio conversion module 228 determines that the incoming signal is received, and stop the signals transmission between the first connecting port 222 and the second connecting port 224. Therefore, the first audio conversion module 228 may convert sound signals transmitted between the first connecting port 222 and the first wireless communication module 226. As a result, the first user may wirelessly communicate with the wireless bridge device 22 through the wireless transceiver 20, while the wireless bridge device 22 is electrically connected with the console base 242 of the public switched telephone network 9, so that the first user and the second user may perform a wireless communication.

The first wireless communication module 226 wirelessly receives the outgoing signal transmitted from the wireless transceiver 20, and the said outgoing signal is processed by the first audio conversion module 228. Thus, the said outgoing signal may match with the specification of the public switched telephone network 9, wherein the first audio conversion module 228 may transmit the said outgoing signal to the first connecting port 222, and the said outgoing signal is transmitted via the first connecting port 222 to the console base 242. Then the console base 242 may transmit the said outgoing signal to the public switched telephone network 9. As a result, the wireless transceiver 20 may communicate with the public telephone of the public switched telephone network 9 via the wireless bridge device 22.

In the same manner, the incoming signal transmitted from the public switched telephone network 9 is transmitted through the console base 242 to the first connecting port 222, and is processed by the first audio conversion module 228. Therefore, the said incoming signal may match with Bluetooth protocol, Wireless LAN protocol, Wireless PAN protocol, Wi-Fi protocol, IEEE 802.11 protocol or ZigBee (802.15.4) protocol, and the first audio conversion module 228 may transmit the said incoming signal to the first wireless communication module 226. Thus, the first wireless communication module 226 may transmit the said incoming signal to the wireless transceiver 20. As a result, the telephone 24 coupled to the public switched telephone network 9 may be coupled with the wireless transceiver 20 through the wireless bridge device 22, so as to perform a two-way communication.

The wireless transceiver 20 may comprise a microphone module 202, a speaker module 204, a second wireless module 206 and a second audio conversion module 208. In practice, the second wireless module 206 may be the following one but not limited thereto: Bluetooth transceiver, Wireless LAN RF transceiver, Wireless PAN RF transceiver, Wi-Fi RF transceiver, IEEE 802.11 RF transceiver or a ZigBee (802.15.4) RF transceiver. The type of the second wireless module 206 is not limited in this embodiment.

The second wireless module 206 may wirelessly transmit the outgoing signal and wirelessly receive the incoming signal. Certainly, the first wireless communication module 226 and the second wireless module 206 may transmit wireless signals based on Bluetooth protocol, Wireless LAN protocol, Wireless PAN protocol, Wi-Fi protocol, IEEE 802.11 protocol or ZigBee (802.15.4) protocol.

The second audio conversion module 208 is coupled among the microphone module 202, the speaker module 204 and the second wireless communication module 206, for converting audio signals transmitted among the microphone module 202, the speaker module 204 and the second wireless communication module 206. In practice, the second audio conversion module 208 is for converting analog audio to digital audio signals, or converting digital audio to analog audio signals. Therefore, the second audio conversion module 208 may convert audio signals, wherein the microphone module 202 for instance may be a microphone, for receiving the outgoing signal. The speaker module 204 for instance may be a speaker, for playing the incoming signal.

It is worth noting that in this embodiment the circuit, hardware or software design of the telephone 24 is not modified, so the wireless bridge device 22 is directly connected between the console base 242 and the telephonic handset 244. Thus, the user may use telephone 24 to dial, and then wait for a communication connection established by two sides of the public switched telephone network 9, and then the user will wirelessly communicate with the wireless bridge device 22 through the wireless transceiver 20, thus, the wireless communication is accomplished. In other embodiments, one skilled in the art may modify circuit, hardware or software design of the telephone 24, so that the user may directly dial through the wireless transceiver 20, and communicate wirelessly with the wireless bridge device 22 to accomplish a wireless communication. The type of the wireless communication system 2 is not limited in the embodiment.

In addition, the first audio conversion module 228 determines whether the incoming signal is received or not in this embodiment, thus signals transmission between the first connecting port 222 and the second connecting port 224 is turned on, and the signals transmission between the first connecting port 222 and the first wireless communication module 226 is turned off. In other embodiments, the first audio conversion module 228 also may determine whether the incoming signal is received or not. Thus, signals transmission between the first connecting port 222 and the second connecting port 224 is turned on, and signals transmission between the first connecting port 222 and the first wireless communication module 226 is turned on; or only signals transmission between the first connecting port 222 and the first wireless communication module 226 is turned on.

In addition, the turning-on or turning-off between the first connecting port 222 and the second connecting port 224 or between the first connecting port 222 and the first wireless communication module 226 may be accomplished based on a design of a controlling switch (not shown) or a controlling circuit (not shown). The controlling switch (not shown) or the controlling circuit (not shown) also may determine whether the incoming signal is received or not, so as to turn on or turn off signals transmission between the first connecting port 222 and the second connecting port 224 or between the first connecting port 222 and the first wireless communication module 226. The type of signals transmission, turned on or turned off by the first audio conversion module 228, between the first connecting port 222 and the second connecting port 224 or between the first connecting port 222 and the first wireless communication module 226 is not limited in the embodiment.

It is worth noting that, the wireless communication system 2 further comprises two handset cords 26a, 26b, and the handset cord 26a is coupled between the first connecting port 222 and console base 242, and the handset cord 26b is coupled between the second connecting port 224 and the telephonic handset 244. In practice, the handset cords 26a, 26b for instance have the connector RJ-11, so that the telephone 24 need not be modified in this present invention, and the user may only insert the said handset cords 26a, 26b into the telephone 24 and the wireless bridge device 22, then the effect of the present invention is attained.

In addition, the wireless bridge device 22 may comprise a first power supply module 230, and the first power supply module 230 is for providing power to the first wireless communication module 226 and the first audio conversion module 228. The first power supply module 230 is such as at least one battery, at least one charged battery or a power connecting port externally connected with a commercial power. The type of the first power supply module 230 is not limited in this embodiment.

In the same manner, the wireless transceiver 20 may comprise a second power supply module 210, and the second power supply module 210 is for providing power to the second wireless communication module 206, the second audio conversion module 208, the microphone module 202 and the speaker module 204. The second power supply module 210 is such as at least one battery, at least one charged battery or a power connecting port externally connected with a commercial power. The type of the second power supply module 210 is not limited in this embodiment.

Third Embodiment

Figure 3:
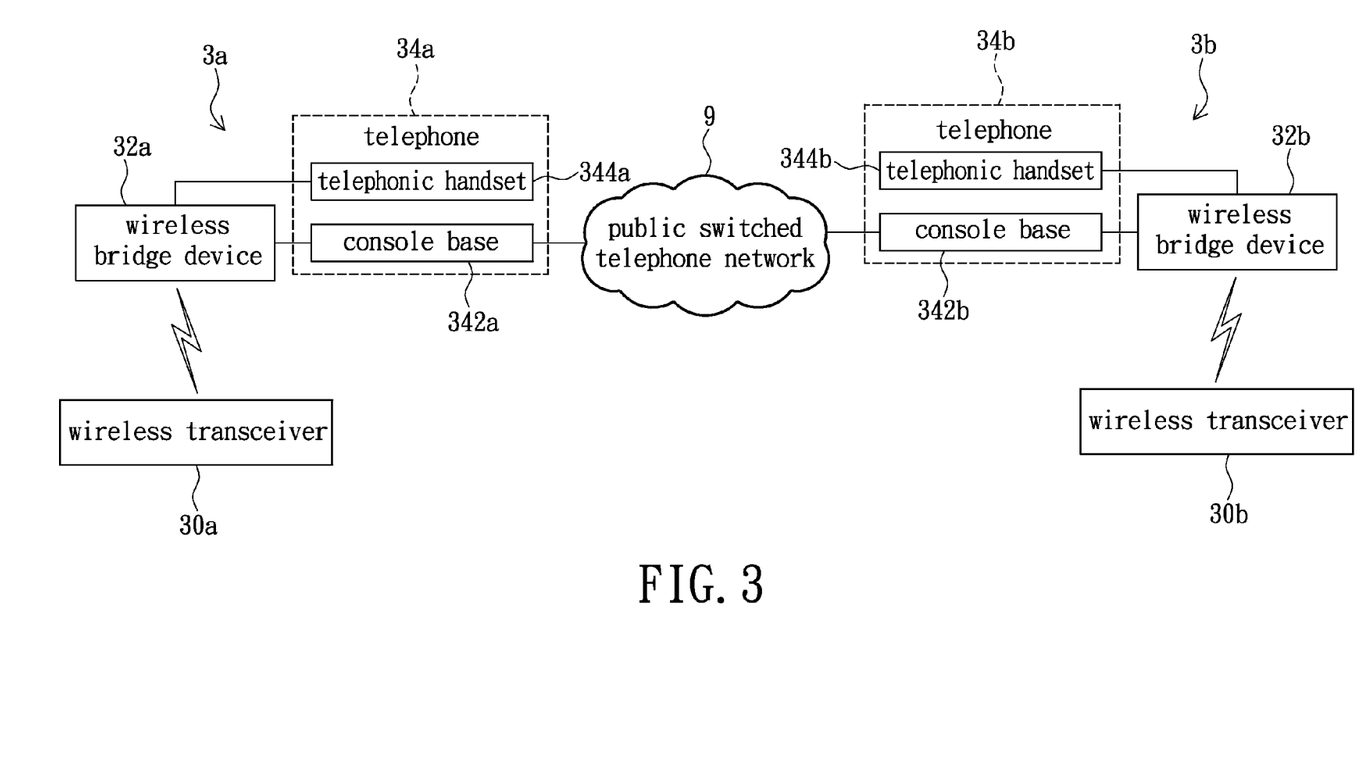
FIG. 3 shows an operation diagram of a wireless communication system of another embodiment in the present invention.

In a third exemplary embodiment of the invention, FIG. 3 shows an operation diagram of a wireless communication system 1 of another embodiment in the present invention.

Please refer to FIG. 3. FIG. 3 shows that arbitrary two terminals in the public switched telephone network 9 are respectively provided with the wireless communication system 3a, 3b by the users, so that the two users may perform a wireless communication.

For example, a first enterprise and a second enterprise may respectively be located in Taipei and Tainan areas. Thus, the first enterprise may use the wireless communication system 3a to call the telephone 34b of the second enterprise in Tainan, and after the telephone 34b and the telephone 34a have established a communication connection, the telephone 34a will transmit the incoming signal transmitted from Tainan to the wireless bridge device 32a. Therefore, the wireless transceiver 30a may play the incoming signal transmitted from Tainan. Certainly, the wireless bridge device 32b also may transmit the incoming signal transmitted from Taipei to the wireless transceiver 30b, so that the wireless transceiver 30b also may play the incoming signal transported from Taipei.

As a result, the first enterprise and the second enterprise may perform a wireless communication at any position of their companies, so that the signal processing path is shortened, the communication quality is enhanced and the communication cost is reduced.

In addition to the above notes, one skilled in the art will understand that operation of the third exemplary embodiment is actually equivalent to operation of the first exemplary embodiment. After one skilled in the art refers to the first exemplary embodiment and the above notes, the third exemplary embodiment will be easily inferred and will not be described repeatedly here.

Fourth Embodiment

Figure 4:
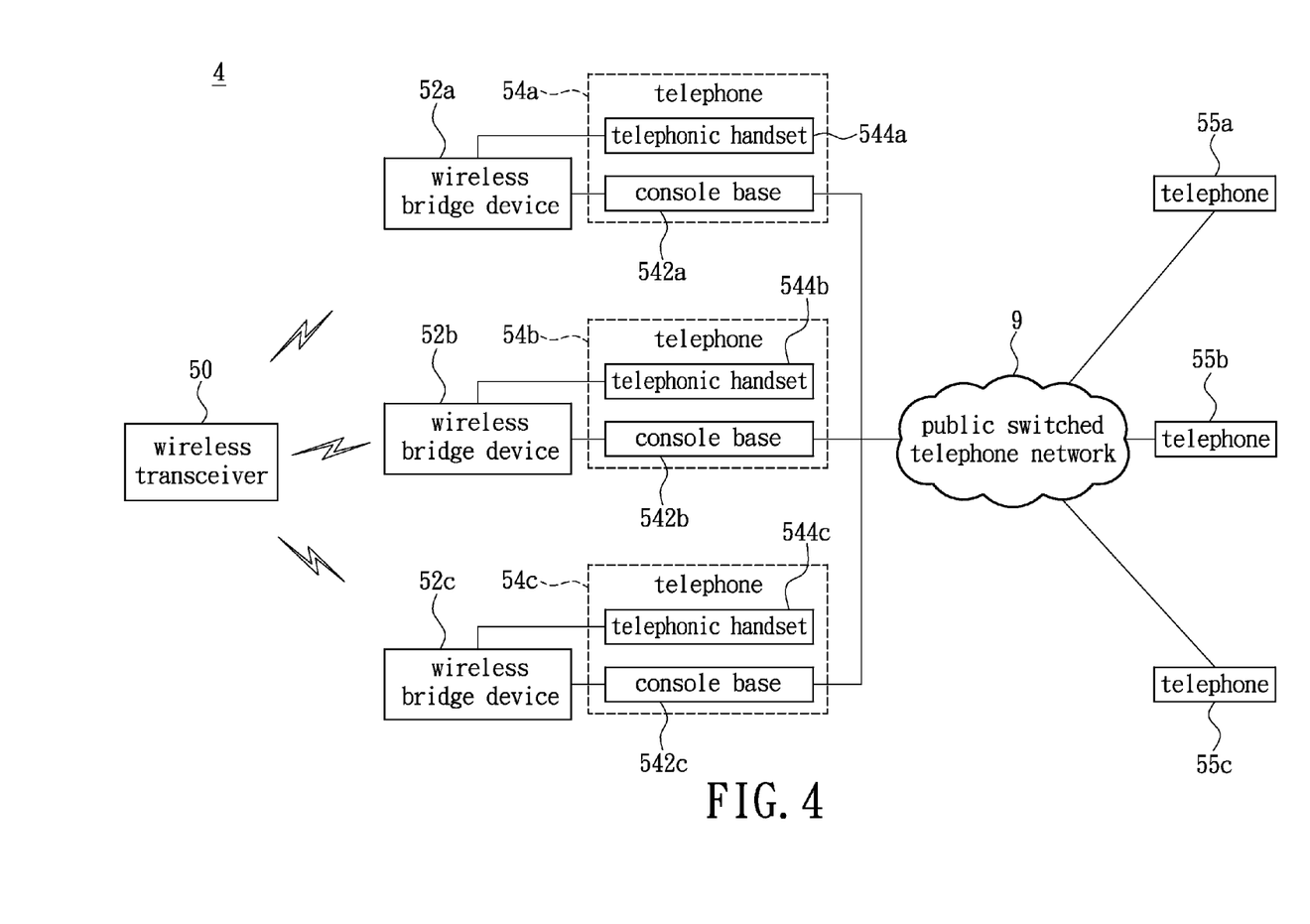
FIG. 4 shows an operation diagram of wireless communication system of another embodiment in the present invention.

In order to be more understandable for one skilled in the art, there is provided a fourth exemplary embodiment of the wireless communication system 4. FIG. 4 shows another operation diagram of a wireless communication system of another embodiment in the present invention. Please refer to FIG. 4. FIG. 4 shows that a user at a single terminal of the public switched telephone network 9 may set a wireless communication system 4 comprising three wireless bridge devices 52a, 52b and 52c and a single wireless transceiver 50. The said wireless bridge devices 52a, 52b, 52c are coupled to telephones 54a, 54b and 54c respectively, and the said wireless bridge devices 52a, 52b and 52c may wirelessly transmit the incoming signal to the wireless transceiver 50 respectively. Certainly, the wireless transceiver 50 may receive multiple incoming signals transmitted from the wireless bridge devices 52a, 52b and 52c respectively at the same time.

In other embodiment, the quantity of the wireless bridge devices 52a, 52b, 52c may be two, four or more, and the quantity of the wireless transceiver 50 may be two, three or more. The quantity of the wireless bridge devices 52a, 52b, 52c and the quantity of the wireless transceiver 50 are not limited in this embodiment. As a result, the wireless bridge devices 52a, 52b, 52c and the wireless transceiver 50 may be "one to one" style, "many to one" style or "one to many" style. The style of the wireless communication system 4 is not limited in this embodiment.

For example, the first enterprise and three inventors may need to discuss simultaneously, wherein the three inventors may live in Taitung, Hualien and Taichung respectively. Thus, the first enterprise may use the wireless communication system 4 to call the telephones 55a, 55b, and 55c of respective inventors living in Taitung, Hualien and Taichung. For example, the telephones 54a, 54b and 54c may establish a communication with the telephones 55a, 55b and 55c respectively in Taitung, Hualien and Taichung, and the incoming signals transmitted from Taitung, Hualien and Taichung will be transmitted to the wireless bridge devices 52a, 52b and 52c. Certainly, the wireless bridge devices 52a, 52b and 52c will transmit the incoming signal transmitted from Taitung, Hualien and Taichung to the wireless transceiver 50, so that the first enterprise may use the wireless communication system 4 to perform Multi-party talking.

As a result, the first enterprise may perform a wireless communication at any position of the company thereof, so that the signal processing path is shortened, and communication quality is enhanced and communication cost is reduced.

In addition to the above notes, one skilled in the art will understand that operation of the fourth exemplary embodiment is actually equivalent to operation of the first exemplary embodiment. After one skilled in the art refers to the first exemplary embodiment and the above notes, the fourth exemplary embodiment may be easily inferred and will not be described repeatedly.

In summary, the wireless bridge device is used in the present invention and is coupled between a telephonic handset and a console base of a telephone coupled to a public switched telephone network, and the wireless bridge device and the wireless transceiver may use Bluetooth protocol, Wireless LAN protocol, Wireless PAN protocol, Wi-Fi protocol, IEEE 802.11 protocol or ZigBee (802.15.4) protocol to transmit wireless signals. Thus, the outgoing signal or the incoming signal may be processed by the first audio conversion module of the wireless bridge device, and then transmitted to the public switched telephone network or the wireless transceiver.

The descriptions illustrated supra set forth simply the preferred embodiment of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A wireless bridge device, for communicating between a telephone of a public switched telephone network and a wireless transceiver, comprising:
    a first connecting port, coupled to a console base of the telephone;
    a second connecting port, coupled to a telephonic handset of the telephone;
    a first wireless communication module, for wirelessly transmitting an incoming signal transmitted from the console base to the wireless transceiver, and for wirelessly receiving an outgoing signal transmitted from the wireless transceiver to the first connecting port;
    a first audio conversion module, coupled between the first wireless communication module and the first connecting port, wherein the first audio conversion module determines whether the incoming signal is received correctly; if so, the first audio conversion module establishes a connection between the first wireless communication module and the wireless transceiver, for converting sound signals transmitted between the telephone and the wireless transceiver.

2. The wireless bridge device according to claim 1, wherein, when the first audio conversion module receives the incoming signal through the first connecting port, the first audio conversion module converts sound format of the incoming signal and outputs the converted sound format to the wireless transceiver through the first wireless communication module.

3. The wireless bridge device according to claim 2, wherein, after the first audio conversion module receives the incoming signal, the first wireless communication module wirelessly receives the outgoing signal transmitted from the wireless transceiver, and the sound format of the outgoing signal is converted and outputted to the first connecting port.

4. The wireless bridge device according to claim 1, wherein the first audio conversion module determines that the incoming signal has not been received, and controls the turning-on between the first connecting port and the second connecting port.

5. The wireless bridge device according to claim 1, further comprising a first power supply module, wherein the first power supply module is for providing power to the first wireless communication module and the first audio conversion module.

6. The wireless bridge device according to claim 5, wherein the first power supply module is at least one battery, at least one charged battery or a power connection port externally coupled to a commercial power.

7. The wireless bridge device according to claim 1, further comprising two handset cords, one of the handset cords being coupled between the first connecting port and the console base, the other of the handset cords being coupled between the second connecting port and the telephonic handset.

8. A wireless communication system, comprising:
   a wireless transceiver, for receiving an outgoing signal; and
   a wireless bridge device according to claim 1, for wirelessly outputting the incoming signal, transmitted from the console base to the telephonic handset, to the wireless transceiver, and for transmitting the outgoing signal received wirelessly from the wireless transceiver to the console base;
   wherein when the wireless transceiver wirelessly receives the incoming signal, the incoming signal is converted to sound and played.

9. The wireless communication system according to claim 8, wherein the wireless transceiver comprises:
   a microphone module, for receiving the outgoing signal;
   a speaker module, for playing the incoming signal;
   a second wireless module, for wirelessly outputting the outgoing signal and wirelessly receiving the incoming signal;
   a second audio conversion module, coupled among the microphone module, the speaker module and the second wireless communication module, for converting audio signals transmitted among the microphone module, the speaker module and the second wireless communication module.

10. The wireless communication system according to claim 9, wherein the wireless transceiver comprises a second power supply module, and the second power supply module supplies power to the second wireless communication module, the second audio conversion module, the microphone module and the speaker module.

* * * * *